United States Patent Office 3,438,957
Patented Apr. 15, 1969

3,438,957
METALATED ACETYLENIC POLYMERS AND
THEIR PREPARATION
Henry L. Hsieh, Bartlesville, Okla., assignor to Phillips
Petroleum Company, a corporation of Delaware
No Drawing. Filed Nov. 9, 1964, Ser. No. 409,989
Int. Cl. C08g 9/00, 1/72
U.S. Cl. 260—94.1                                      7 Claims

ABSTRACT OF THE DISCLOSURE

Production of acetylenic polymers by contacting a polyalkali metal substituted 1-acetylene with a polyhalide compound of a Group III–B or IV–B metal.

---

This invention relates broadly to polymers of metalated acetylenes and the preparation of such polymers. In accordance with one aspect, this invention relates to a novel process for the preparation of polymers of metalated 1-acetylenes formed by reacting metalated acetylenes with selected halides. In accordance with another aspect, this invention relates to the production of polymers of metalated acetylenes from 1-acetylenes, organo alkali metal compounds, and selected metal halide compounds. In accordance with a further aspect, this invention relates to novel polymers from polymetalated acetylenes having metal atoms of metals selected from Group III–B and Group IV–B and acetylenic linkages.

There has been considerable interest in recent years in methods for the preparation of alkali metal derivatives of acetylenes. However, no simple method is known for preparing such compounds and, therefore, there is considerable interest in developing improved processes for preparing such compounds. It has now been discovered that polymers of polymetalated acetylenes can be prepared by reacting polymetalated acetylenes with halogen-containing compounds containing metals of Group III–B and IV–B.

By various aspects of this invention, one or more of the following, or other, objects can be obtained.

An object of this invention is to provide novel polymers of metalated 1-acetylenes.

Another object of this invention is to provide a novel process for the preparation of polymers of metalated 1-acetylenes.

Other objects, aspects and the several advantages of this invention will be apparent to those skilled in the art from a study of this disclosure and the appended claims.

Broadly, according to the invention, novel acetylenic polymers are provided which are prepared by contacting (a) an alkali metal substituted 1-acetylene compound containing at least two alkali metal atoms with (b) a halide compound of a Group III–B or Group IV–B metal. It has been found that polymers prepared by reacting the above reactants contain both metal atoms of said Group III and Group IV metals and, also, acetylenic linkages.

More specifically, according to the invention, a polymerization process for forming polymers of acetylenes is provided which comprises contacting:

(a) A polymetalated acetylene compound of the formula $$Y-C\equiv C-M$$

(Formula I)

wherein Y is selected from

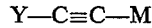

and 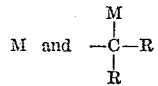

radicals and wherein each R is selected from hydrogen, M and monovalent hydrocarbon radicals including saturated aliphatic, saturated cycloaliphatic and aromatic radicals having up to and including 12 carbon atoms per molecule, and M is an alkali metal, with (b) A halide compound of the formula

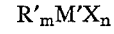

(Formula II)

wherein R' is a hydrocarbon radical selected from saturated aliphatic, saturated cycloaliphatic and aromatic radicals having up to and including 20 carbon atoms per molecule, M' is a metal selected from the metals in Groups III–B and IV–B of the Periodic Table (Mendelyeev), i.e., boron, aluminum, gallium, indium, thallium, silicon, germanium, tin, and lead, X is a halogen including fluorine, chlorine, bromine and iodine, $n$ is an integer of from 2 to 4, $m$ may equal zero and $n$ plus $m$ equals the valence of the metal M'.

Representative examples of some metal-substituted 1-acetylene compounds contemplated within the above described Formula I include:

dilithium acetylide
disodium acetylide
1,3-dilithiopropyne
1,3,3-trilithiopropyne
1,3,3,3-tetralithiopropyne
1,3,3-trilithio-1-butyne
1,3-dilithio-1-butyne
1,3-disodiopropyne
1,3,3-trisodiopropyne
1,3,3,3-tetrasodiopropyene
1,3-dipotassio-3-methyl-1-butyne
1,3-dilithio-3-methyl-1-pentyne
1,3-dirubidio-3-ethyl-1-pentyne
1,3-dicesio-3-propyl-6-methyl-1-heptyne
1,3-dipotassio-3-nonyl-1-dodecyne
1,3-difrancio-3-dodecylpenta-1-decyne
1,3,3-trisodiopenta-1-decyne
1,3-dilithio-3-cyclopentylpropyne
1,3,3-tripotassio-3-cyclopentylpropyne
1,3-disodio-3,3-dicyclohexylpropyne
1,3-disodio-3-cyclopentylpropyne
1,3-dilithio-3,3-diphenylpropyne
1,3-dilithio-3-(2-naphthyl)propyne
1,3,3-trirubidio-3-(2-naphthyl)propyne
1,3-dilithio-3-benzyl-4-phenyl-1-butyne
1,3-dilithio-3-cyclohexyl-1-butyne
1,3,3-tricesio-4-cyclohexyl-1-butyne
1,3-dilithio-3-(3-methylcyclopentyl)-1-butyne
1,3,3-trifrancio-3-(3-methylcyclopentyl)propyne
1,3-dilithio-3,3-bis(p-tolyl)propyne
1,3-disodio-3-(4-methylnaphthyl)propyne
1,3-dilithio-3-(4-cyclohexylphenyl)-1-butyne
1,3,3-tripotassio-3-(4-cyclohexylphenyl)propyne
1,3-dirubidio-3-(4-phenylcyclohexyl)propyne
1,3,3-trifrancio-3-(3-phenylcyclohexyl)propyne and the like.

Representative examples of some metal halide compounds contemplated within the above described Formula II include:

boron trifluoride
boron trichloride
ethylboron dibromide
aluminum chloride
aluminum iodide
gallium tribromide
indium trichloride
thallium tribromide
silicon tetrachloride germanium tetrabromide
stannic chloride
n-butylaluminum dichloride
lead tetrachloride
dichloromethylborane
dibromo-n-hexylborane
ethylaluminum dichloride
tridecylaluminum diiodide
tert-butylgallium diiodide
isopropylindium difluoride
cyclohexylthallium dichloride
dichlorodimethylsilane
tribromoethylsilane
dibromodimethylgermane
dichlorodicyclohexyltin
tribromobenzyltin
phenylgallium diiodide
dichlorodiemthyllead
diiododiphenyllead
eicosylaluminum dichloride In addition to the foregoing halides, sesquihalides such as ethylaluminum sesquichloride, butylaluminum sesquibromide, and the like can be employed.

The polymeric products formed when the alkali metal-substituted 1-acetylenes are reacted with the inorganic halides or organometal halides are coupled and/or branched, the extent of said coupling and/or branching being determined, at least in part, by the number of alkali metal atoms per molecule in the acetylenic compound, the number of halogen atoms in the halide reactant, and the amount of the halide reactant used. The amount of halide reactant is generally in the range of 0.8 to 1.5 equivalents of halogen per equivalent of alkali metal in the acetylenic reactant. For maximum coupling and/or branching, the quantity of halide reactant employed (based on halogen content) should be stoichiometrically equivalent to the alkali metal atoms in the acetylenic reactant.

In order to obtain polymeric products of the type herein described, the alkali metal-substituted 1-acetylene reactant contains at least two alkali metal atoms per molecule and the halide reactant contains at least two halogen atoms per molecule. The temperature employed is generally in the range of −75 to 150° C. Reaction time will depend upon the temperature. It is generally in the range of 5 minutes to 50 hours.

One method of preparing alkali metal-substituted acetylenes (Formula I) comprises contacting:

(a) An organoalkali metal compound of the formula $$QM_x$$

(Formula III)

wherein Q is a hydrocarbon radical selected from the group consisting of saturated aliphatic, saturated cycloaliphatic and aromatic radicals generally containing up to and including 20 carbon atoms, M is an alkali metal including, specifically, lithium, sodium, potassium, rubidium, cesium and francium, and $x$ is an integer from 1 to 4, inclusive, with (b) A 1-acetylene compound of the formula $$ZC{\equiv}CH$$

(Formula IV)

wherein Z is selected from hydrogen and $R''_2CH-$ radicals, wherein each $R''$ is selected from hydrogen and monovalent hydrocarbon radicals selected from saturated aliphatic, saturated cycloaliphatic and aromatic radicals generally containing up to and including 12 carbon atoms, said contacting being effected in an inert liquid reaction medium at a temperature ranging from −75 to 150° C. under sufficient pressure to maintain liquid phase conditions and employing a mol ratio of (a) to (b) ranging from 2:1 to 10:1.

In the above formula (Formula III), the Q group has a valence equal to the integer $x$ and preferably contains from 1 to 20, inclusive, carbon atoms, although it is within the scope of the invention to use higher molecular weight compounds.

Representative examples of alkali metal hydrocarbon compounds of Formula III that can be employed according to the present invention include:

methylsodium
isopropylpotassium
n-butyllithium
tert-butylpotassium
n-amylrubidium
tert-octylcesium
n-decyllithium
nonylsodium
cyclohexyllithium
methylcyclohexylcesium
phenylsodium
naphthylpotassium
phenyllithium
4-butylphenylrubidium
phenylfrancium
p-tolylsodium
4-phenylbutylsodium
2,4-diethylphenyllithium
benzylsodium
4-cyclohexylphenyllithium
3-phenylcyclohexylpotassium
dilithiomethane
1,4-disodiobutane
1,10-dipotassiodecane
1,20-dirubidioeicosane
1,4-difranciocyclohexane
1,4-dicesiobenzene
1,5-dilithionaphthalene
1,2-dilithio-1,2-diphenylethane
1,5-disodioanthracene
1,2-dipotassio-1,8-diphenyloctane
1,3,5-trilithioanthracene
1,5,10-trifranciodecane
1,5,15-tricesioeicosane
1,3,5-trisodiocyclohexane
1,2,5-tripotassionaphthalene
1,3,5-trilithioanthracene
1,3,5,8-tetralithiodecane
1,5,10,20-tetrasodioeicosane
1,2,4,6-tetrapotassiocyclohexane
1,2,3,5-tetracesio-4-hexylanthracene and the like.

Representative examples of 1-acetylenes of Formula IV that can be employed according to the invention include:

acetylene
propyne
1-butyne
3-methyl-1-butyne
3-methyl-1-pentyne
3-ethyl-1-pentyne
3-propyl-6-methyl-1-heptyne
3-dodecylpenta-1-decyne
6-ethyl-6-propyl-1-nonyne
8-methyl-6-butyl-1-decyne
3-cyclopentylpropyne
3,3-dicyclohexylpropyne
3,3-diphenylpropyne
3-(2-naphthyl)propyne
3-benzyl-4-phenyl-1-butyne
4-cyclohexyl-1-butyne
3-(3-methylcyclopentyl)-1-butyne
3,3-bis(p-tolyl)propyne
3,8-bis(p-tolyl)-1-octyne
3,6-diphenyl-1-hexyne
3-(4-methylnaphthyl)propyne 3-(4-cyclohexylphenyl)-1-butyne
3-(3-phenylcyclohexyl)propyne
and the like.

Illustrative examples of the reactions of the alkali metal hydrocarbons with the 1-acetylenes according to the invention are:

(1) $HC{\equiv}CH + 2n\text{-}C_4H_9Li = LiC{\equiv}CLi + 2n\text{-}C_4H_{10}$ (2) $CH_3C{\equiv}CH + 2n\text{-}C_4H_9Li = CH_2LiC{\equiv}CLi + 2n\text{-}C_4H_{10}$ (3) $CH_3C{\equiv}CH + 3n\text{-}C_4H_9Li = CHLi_2C{\equiv}CLi + 3n\text{-}C_4H_{10}$ (4) $CH_3C{\equiv}CH + 4n\text{-}C_4H_9Li = CLi_3C{\equiv}CLi + 4n\text{-}C_4H_{10}$ As indicated above, the reactions can be made to proceed predominantly step-wise by proper choice of operating conditions, such as mol ratio of reactants, temperature, time, organoalkali metal compound used, and related process variables. For example, in the above tabulated reactions, the reactions can be controlled to favor substitution of 2, 3 or 4 alkali metal atoms, for example lithium, per molecule of 1-acetylene.

The ratio of reactants, expressed as gram atoms of alkali metal M per mol of $R'C{\equiv}CH$ compound, employed in the above process reactions is in the range of 2:1 to 10:1, preferably in the range of 2:1 to 6:1 on the same basis, and is one of the principal variables used to control the number of substituent alkali metal atoms. The reaction time employed generally is in the range of 1 second to 10 days, preferably in the range of 1 minute to 4 days, and is another of the reaction variables used to control the number of substituent alkali metal atoms. The reaction temperature employed is generally in the range —75 to 150° C., preferably in the range 0 to 100° C., and is a further process variable used to control the number of substituent alkali metal atoms. The reaction pressure need be only that required to maintain the reactants substantially in liquid phase, for example, pressures from atmospheric to 500 p.s.i.g., or more.

The above-described reactions of the invention can be carried out in the presence of an inert reaction diluent comprising a hydrocarbon such as aromatic hydrocarbons, paraffins, and cycloparaffins and/or an inert organic polar compound. Representative examples of suitable hydrocarbon reaction diluents that can be employed include benzene, toluene, cyclohexane, methylcyclohexane, xylene, n-butane, n-hexane, isooctane, decane, dodecane, and the like. Preferred hydrocarbons are those containing from about 4 to about 12 carbon atoms per molecule. Examples of suitable inert organic polar compounds that can be employed as the reaction diluent are ethers, thioethers and tertiary amines such as diethyl ether, ethyl propyl ether, dibenzyl ether, tetrahydrofuran, dioxane, diethyl sulfide, tri-n-propylamine, N,N-dimethylaniline, and the like. It is within the scope of the invention to utilize the above reaction diluents singly or in combination with each other, for example, mixtures of different hydrocarbons as well as mixtures of hydrocarbons with the defined polar compounds.

Numerous variations in operative procedure for carrying out the reactions of the invention can be employed. The processes defined, according to the invention, can be carried out in a batch, semicontinuous or continuous manner, depending upon the equipment available and the desired operative procedure for carrying out the reactions.

The polymer products prepared according to the invention can range from liquids to rubbery materials or plastic materials, depending upon the types and amounts of reactants utilized and the liquid polymers, for example, can subsequently be cured to form solids if desired. The polymers can be compounded by the various methods such as have been used in the past for compounding rubbers using, for example, a roll mill or a Banbury mixer. Reinforcing agents and compounding ingredients normally employed in rubbers can also likewise be included with the polymers of the invention. Similarly, the polymers of the invention can be blended with other polymers such as natural rubber, other synthetic rubbers, polyolefins and the like. Polymeric products of the invention are useful as adhesives, potting compounds, sealants, tread stocks, and for making many types of molded objects.

A better understanding of the invention can be obtained by referring to the following illustrative examples.

Example I

A run was made in which 24 millimoles of n-butyllithium was reacted with 8 millimoles of propyne in the presence of 100 milliliters of cyclohexane. The reaction time was 6 hours and the temperature was 122° F. A dark yellow precipitate of $CHLi_2C{\equiv}CLi$ was formed. Twenty milliliters of tetrahydrofuran was added to the reaction mixture and then 20 millimoles of dichlorodimethylsilane $[(CH_3)_2SiCl_2]$. A rapid reaction occurred. The mixture was agitated for 16 hours while the temperature was held at 122° F. The reaction was shortstopped with isopropyl alcohol, after which the mixture was washed with water and the polymer recovered by evaporation of the diluent. The product was a dark brown, rubbery solid. It had an inherent viscosity of 0.08 and contained 25 weight percent toluene insolubles, indicative of a network structure. Infrared analysis run on a thin film of the polymer revealed the presence of —C≡C— and

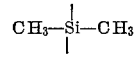

Example II

Forty-eight millimoles of isopropyllithium was reacted with 16 millimoles of propyne in the presence of 100 milliliters of cyclohexane at a temperature of 122° F. for 4 hours. Twenty milliliters of tetrahydrofuran was added to the reaction mixture followed by 24 millimoles of dichlorodimethylsilane. The reactants were agitated 24 hours while the temperature was maintained at 122° F. The reaction was terminated by the addition of 10 millimoles of isopropyllithium, the purpose of which was to replace any unreacted halogen with isopropyl groups, after which isopropyl alcohol was introduced to inactivate the system. The mixture was washed with water and the polymer recovered by evaporation of the diluent. The product was a dark orange, rubbery solid. Unsaturation was determined by iodine chloride titration. The amount of iodine chloride (ICl) required was 9.05 millimoles/gram polymer. Toluene insoluble material was 32 weight percent. Examination by infrared revealed the presence of

—C≡C— and

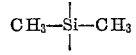

The procedure used to determine total unsaturation by iodine chloride titration was as follows: A 0.5-gram sample of polymer was dissolved in a 75/25 volume mixture of carbon disulfide and chloroform, a chloroform solution of iodine chloride of known concentration (approximately 0.09–0.10 molar) was added, the mixture was placed in a 25° C. bath for one hour to allow time for reaction, and the excess of iodine chloride was titrated with 0.05 N sodium thiosulfate. The millimoles of iodine chloride that reacted with one gram of sample was then calculated. A blank was run using only solvent and iodine chloride and appropriate correction was made when calculating unsaturation.

Infrared analyses of polymers from both examples were run on thin films prepared by spreading the polymer on a standard KBr pellet. A band at 4.6 microns indicated —C≡C—, bands at 7.1 and 8.0 microns indicated

and a band at 12.5 microns indicated

These conclusions were based on known spectra.

Reasonable variation and modification are possible within the scope of the foregoing disclosure and the appended claims to the invention, the essence of which is that novel polymers of polymetalated acetylenes have been provided and wherein such polymers are produced by reacting an alkali metal-substituted 1-acetylene with a metal halide compound to form a polymeric product containing acetylenic linkages and metal atoms of the halide compound.

I claim:

1. A polymerization process which comprises contacting:
 (a) an alkali metal-substituted 1-acetylene compound containing at least two alkali metal atoms with
 (b) a dichlorodialkylsilane.

2. A polymerization process for forming polymers of acetylenes which comprises contacting:
 (a) a polymetalated acetylene compound of the formula

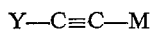

wherein Y is selected from

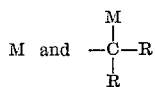

radicals and wherein each R is selected from hydrogen, M and monovalent hydrocarbon radicals including saturated aliphatic saturated cycloaliphatic and aromatic radicals having up to and including 12 carbon atoms per molecule, and M is an alkali metal, with
 (b) a dichlorodialkylsilane.

3. A process according to claim 2 wherein
 (a) is a lithium substituted 1-acetylene and
 (b) is a dichlorodialkylsilane.

4. A polymerization process according to claim 2 which comprises contacting (a) with (b) at a temperature in the range −75 to 150° C., the quantity of (b) employed being in the range of 0.8 to 1.5 equivalents of halogen per equivalent of alkali metal in the acetylenic reactant, and recovering polymer thus produced.

5. A polymerization process for forming acetylenic polymers which comprises contacting (a) butyllithium with (b) propyne to form a trilithiopropyne, and then contacting same with (c) dichlorodimethylsilane.

6. A polymerization process for forming acetylenic polymers which comprises contacting (a) isopropyllithium with (b) propyne to form a polylithium-substituted propyne, and then contacting same with (c) dichlorodimethylsilane.

7. The polymer produced according to claim 2.

References Cited

UNITED STATES PATENTS

| 3,174,956 | 3/1965 | Luttinger | 260—88.1 |
| 3,303,225 | 2/1967 | Hsieh et al. | 265—665 |

FOREIGN PATENTS

| 1,258,764 | 3/1961 | France. |

OTHER REFERENCES

Wotiz et al.: Journal American Chem. Soc., vol. 83, pp. 373–375, Jan. 20, 1961.

JOSEPH L. SCHOFER, *Primary Examiner.*

WILLIAM F. HAMROCK, *Assistant Examiner.*

U.S. Cl. X.R.

252—429, 449; 260—679